July 18, 1967 R. G. TUGEN ETAL 3,331,113
METHOD OF AND APPARATUS FOR HARDENING FELT
Filed Jan. 15, 1965 2 Sheets-Sheet 1
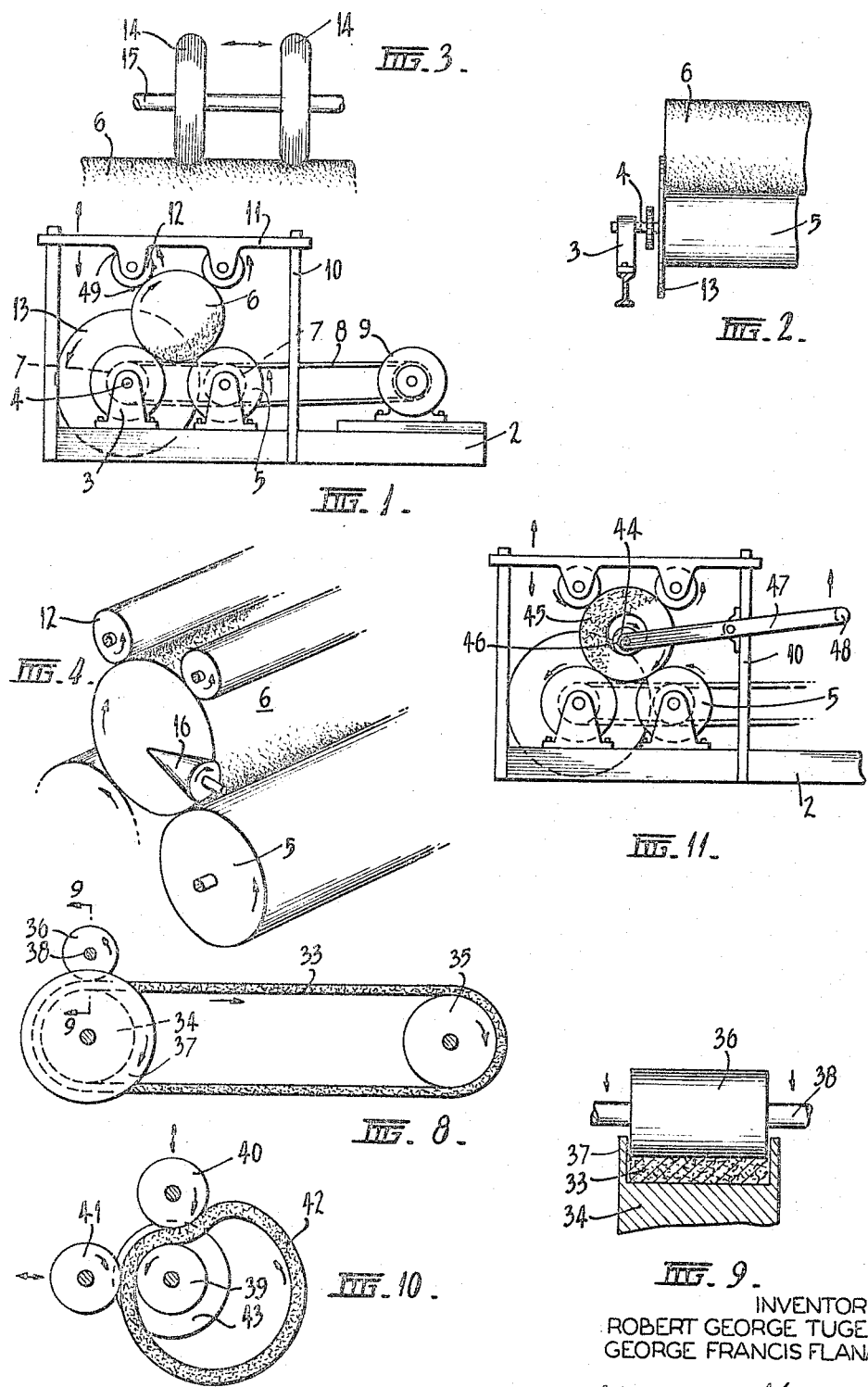
INVENTORS
ROBERT GEORGE TUGEN
GEORGE FRANCIS FLANAGAN
Stowell & Stowell
ATTORNEYS 
United States Patent Office 3,331,113
Patented July 18, 1967

3,331,113
METHOD OF AND APPARATUS FOR HARDENING FELT
Robert George Tugen, Hawthorn, Victoria, and George Francis Flanagan, Pascoe Vale, Victoria, Australia, assignors to Commonwealth Scientific and Industrial Research Organization, East Melbourne, Victoria, Australia
Filed Jan. 15, 1965, Ser. No. 425,814
Claims priority, application Australia, Jan. 30, 1964, 40,310/64
10 Claims. (Cl. 28—5)

This invention relates to the hardening of felt produced from suitable fibrous material and especially from sheeps' wool or mixtures thereof with other fibres.

Wool felts are generally produced in the form of flat sheets of substantially uniform thickness, the felting operation being generally commenced and sometimes completed in a machine known as a flat hardener which comprises horizontally arranged upper and lower steam-heated platens. The upper platen is movable vertically and is weighted so as to subject the material to the requisite pressure, which usually is rather more than one pound per square inch, while also at least one of the platens is arranged to be vibrated or shaken in its own plane so that each point thereof reciprocates in a straight line or moves in a circular or elliptical path without rotation relative to the other platen.

The felt is usually formed from a wool batt which comprises many layers of carded wool web and which after being moistened with wet steam or water sprays is pressed and rubbed between the relatively moving platens so that the constituent fibres are moved relatively whereby they interlock or felt together to form a self-sustaining sheet which becomes progressively more hard and dense as the operation continues.

An alternative type of felt hardening machine is a roller hardener which comprises upper and lower banks of rollers between which the batt is subjected to pressure and in which the rubbing action is produced by vibrating some of the rollers axially. This type of machine has the advantage that the material moves continuously through it.

While it is possible to produce felt suitable for many purposes by flat hardening or roller hardening alone it is usual to subject the hardened sheets so formed to a subsequent operation known as milling or fulling and which is often regarded as being the real felting process. Milling or fulling is carried out by placing a loose heap of the hardened felt sheets in the bowl of a machine known as a stock and which has a series of wooden hammers or other heavy members which pound the material in order to render it still more dense and strong.

There is considerable demand particularly for industrial purposes for shaped articles of thick flat felt such as circular discs, rings and the like and such articles are generally stamped from preformed felt sheets of the required thickness formed in a flat hardener.

It has also been proposed to produce shaped felt articles directly from unfelted fibrous material, that is to say, the material is simultaneously felted and shaped into discs, rods, rings, tubes and the like, one such method being disclosed in the specification of Robert G. Tugen co-pending patent application No. 425,757.

Articles so produced may be incompletely felted and so may require a subsequent hardening treatment while also it may be necessary or desirable to further harden and densify articles of felt cut from sheets of felt produced in the usual way by flat or roller hardening.

It is an object of this invention to provide an improved method of and apparatus for hardening felt.

Accordingly the invention includes the method of hardening felt comprising subjecting preformed felt to pressure between rotating rollers while confining the felt laterally i.e. in the lengthwise direction of the rollers.

The invention is not confined to but is particularly suitable for the hardening of felt cylinders, rings, endless belts, bands or the like, circular shapes having various profiles.

In one particular form of the invention which is used when cylinders or tubes of felt are being hardened the cylinder or tube is positioned between a plurality of rollers some, at least, of which are driven and at least some of which are moveable so that pressure can be applied to the felt.

In one particular form of apparatus of this type the felting may be speeded by providing pressure rollers having a relatively small width which are moveable along the felt.

In another form there can be provided three or more pressure rollers each of which has a diameter greater than the felt to be hardened and are so located that the outer periphery of the felt is distorted during the hardening operation.

In an embodiment of the invention in which belts or bands are to be hardened the felt may be passed continuously between a single pair or number of pairs of rollers until it is hardened to required extent. For this purpose one of the rollers extends transversely through the ring, band or the like and the circumference of this inner roller is preferably substantially less than the circumferential length of the inner surface of the ring or the like so that each portion of the felt is subjected to bending or flexure as it passes onto and from the surface of the roller as such movements of the felt produce rapid hardening.

In some cases and particularly for the manufacture of endless belts, bands and the like, the latter may advantageously be arranged to pass around two spaced pulleys or the like and at least one of the latter serves as an inner roller as above described. That is to say an outer roller is arranged to compress the felt as it passes around one of the pulleys or each of the latter may serve as an inner roller in which case a corresponding outer roller is disposed parallel therewith and adjacent thereto so that the felt is compressed as it passes between the spaced pair of rollers.

It will be apparent also that two or more spaced outer rollers may be arranged to co-act with an inner roller disposed parallel thereto so that the felt is compressed between each outer roller and the inner roller as it passes around the latter.

One at least of the rollers may if desired be subjected to vibration in the direction of its axis while also the rollers or one of them may be heated.

The invention also includes felt hardening apparatus which comprises at least three rollers between which a cylinder or tube of felt is adapted to be positioned, one at least of the rollers being mounted for movement relative to the other rollers to permit the felt to be positioned therebetween and to apply pressure to the felt when positioned, and means for rotating at least one of the rollers.

Preferably means may be provided to laterally confine the felt in position between the rollers but this is not essential.

In one specific form there may be provided two base rollers one or both of which are driven and one or a plurality of other rollers adapted to be positioned above the base rollers and to apply pressure on a felt cylinder located thereon.

In another form of the invention there are provided three rollers each of which is driven and one of which is moveable to enable a felt cylinder or tube to be positioned therebetween and to have pressure applied thereto by the moveable roller.

Preferably each of the three rollers is driven in the same direction at the same speed and also preferably the rollers are of larger diameter than the diameter of the felt cylinder to be hardened. In this way there can be a relatively large degree of peripheral compression of the felt cylinder or tube which speeds the hardening operation.

Also included within the invention is a felt hardening apparatus comprising at least one pair of parallel rollers, one at least of which is mounted for movement towards and from the other roller, means for rotating at least one of the rollers and means for laterally confining felt passed between the rollers.

In one form of the invention one of the rollers is provided with spaced radially projecting flanges to confine the felt laterally while the rim of the co-acting roller is of a width such that it is capable of projecting neatly into the space between the flanges.

Alternatively two plain or unflanged rollers may be arranged transversely between fixed parallel end plates or walls which serve to confine the felt laterally. These end walls may be formed with slots through which the spindle of one of the rollers extends whereby this roller is movable towards and from the co-acting roller. While these slots would permit the felt to expand laterally the felt may be moved at a linear speed such that it does not expand significantly as it passes the slots and reengages those portions of the side plates or walls which are on the opposite or following sides of the slots.

According to a third form of the invention the aforesaid spaced rollers are both plain or unflanged and are arranged neatly between a second spaced parallel pair of rollers which have their axes disposed at right angles thereto and in or close to the plane containing the axes of the firstmentioned rollers. The four rollers thus define an intervening opening of rectangular or other predetermined shape between which the felt is compressed as it passes therethrough. Thus when each roller uniform in diameter throughout its length the said opening is of rectangular shape while openings of a variety of different shapes may be formed by the use of roller having different profile shapes.

Provision is made for moving at least one of the rollers towards and from the other so that the felt may be subjected to pressure therebetween while also either or both of the secondmentioned pair of rollers may be vibrated axially.

As above stated the invention is particularly suitable for use in hardening felt cylinrers or tubes and annular felt members such as rings, belts and bands of rectangular shape in cross-section and for this purpose one of the firstmentioned rollers extends through the central opening in the felt annulus while the latter is being hardened. It will thus be evident that as the rollers are rotated the felt passes continuously between them and so may be hardened to any required extent by continuing the operation for a suitable time while applying a suitable pressure to the felt.

For the aforesaid purpose one end of at least one of the rollers is preferably either unsupported or else is mounted in detachable supporting means in order that the felt annulus may be arranged about and later removed from that roller.

The invention also includes the formation of flat sheet felt by initially forming in the aforesaid manner an endless band of the required length, width and thickness and by then cutting the band transversely at one or more positions. The sheet or sheets may then be subjected to an ironing, rolling or other suitable straightening operation.

In order that the invention may be more readily understood and put into practice reference will now be made to the accompanying drawings in which:

FIGURE 1 is a side elevation of one form of hardening apparatus made in accordance with the invention;

FIGURE 2 is a partial end elevation of the rear roller of the apparatus shown in FIGURE 1 showing the retaining plate and the felt cylinder in position;

FIGURE 3 shows an alternative form of idler roller to be used with the apparatus of FIGURE 1 either instead of or as well as the idler rollers illustrated;

FIGURE 4 is a part perspective view of one end of an apparatus which is similar to that illustrated in FIGURE 1 but in this case the end retaining plate is replaced by a roller which may preferably be moveable towards and away from the felt cylinder or tube;

FIGURE 8 is a schematic view of an apparatus for hardening a band or the like of felt;

FIGURE 9 is a section along line 9—9 of FIGURE 8 and illustrates the constraining of the felt as it passes between the rollers;

FIGURE 10 is a modified form of apparatus which is basically similar to that of FIGURES 8 and 9 but in which there are two rolling actions between the three rollers; and FIGURE 11 shows an apparatus which is a modification of the apparatus of FIGURE 1 but which is adapted for use with tubes of felt and in which pressure is applied to the inside as well as to the outside of the felt tube.

Figure 6:
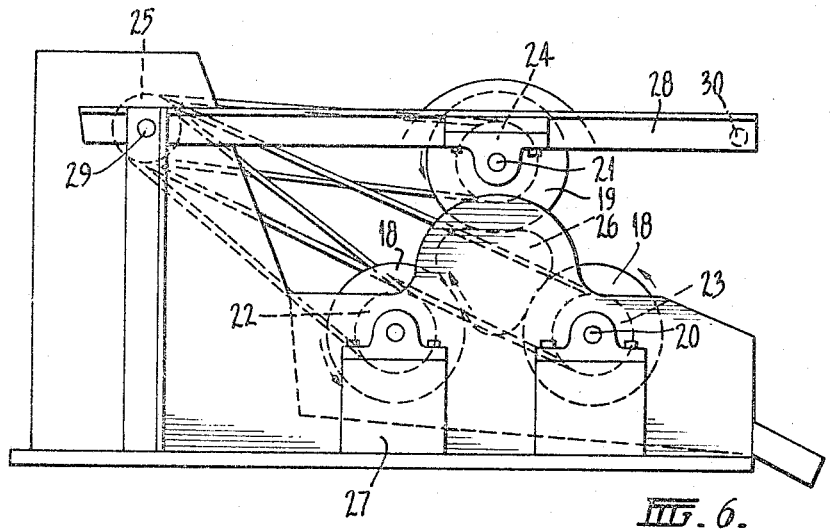
FIGURE 6 is an illustration of an alternative type of apparatus in which there are three rollers each of which is of the same size and all of which are driven, the machine having therein a solid cylinder of felt.

The apparatus illustrated in FIGURES 1 and 2 shows one form of apparatus made in accordance with the invention. This apparatus has a base 2 having mounted thereon bearings 3 which bearings are adapted to receive spindles 4 which carry rollers 5. The materials from which these rollers are made are not critical but they may preferably be provided with a rough surface so that the friction between the roller and the felt cylinder 6, mounted thereon, is as high as possible. Each roller 5 is provided with a sprocket 7, which is shown in broken lines and these sprockets are interconnected by way of a chain 8 to an electric motor 9. It can be understood of course that the rearward roller 5 may be provided with two sprockets and be connected to the motor by means of one of these sprockets and be connected to the other roller by means of a short chain between the second of the two sprockets and the sprocket on the forward roller. Connected to the base 2 is an upwardly extending frame 10 which may comprise four upright members spaced around the rollers 4. Removably fitted to this frame is a carrier 11 which has connected thereto idler rollers 12. This carrier 11 may be removed from the frame 10 to enable a cylinder of felt 6 to be positioned on the rollers 5 and then on replacement the idler rollers 12 bear on the upper surface of the cylinder 6 as illustrated. If required the carrier 11 can be weighted to apply pressure or alternatively, other means may be provided to apply pressure to the carrier 11.

In some applications a vibrating force may be applied to the carrier 11 so that a "hammering" effect can be transmitted to the felt cylinder 6. One way of providing such a force is to provide a rotating shaft having an eccentric member mounted thereon positioned so that on rotation the eccentric member acts on the carrier 11.

Also if desired one of the rollers may be provided with rib 49, illustrated on FIGURE 1 to provide the same effect. Preferably these ribs are not equally spaced so there is little likelihood of them striking the same part of the felt cylinder 6 on subsequent revolutions.

Fitted to each end of the forward roller 5 is a plate 13 which extends sufficiently to reach the centre point of any size cylinder of felt 6 which is to be fitted to the apparatus. This plate acts when the apparatus is being used to prevent axial expansion of the felt which is normally undesirable.

In operation the carrier 11 is either lifted to its upper position or removed from the frame 10 and a cylinder of felt 6 to be hardened is positioned on the two rollers 5. This felt may be formed by any desired method but normally when it is placed onto the rollers 5 it should be damp and may also be hot. If desired the apparatus may be provided with a heater and liquid spray, not illustrated, to ensure that this felt 6 is kept warm and damp at all times.

When the cylinder of felt is in position the carrier 12 is positioned and the felt is located between the two rollers 5 and the idler rollers 12. The motor 9 is started and pressure is applied by means of the idler rollers and the felting operation commences.

During felting the diameter of the felt cylinder 6 diminishes as the fibres from which it is comprised interlock but at all times pressure is maintained on the rollers to ensure that the shrinkage does not lessen the pressure applied. The plates 13 prevent axial expansion of the felt so that the hardened felt cylinder is of a smaller diameter than the original cylinder but is either of the same length or is of a length which is limited by the spacing between the two plates 13.

The hardening operation may be continued for as long as desired so that the felt in the cylinder 6 has the required hardness on completion of the operation.

The rollers 14 illustrated in FIGURE 3 may be used in association with the apparatus in FIGURE 1 either with or without the idler rollers 12 previously referred to.

These rollers 14 are mounted on a shaft 15 and are formed so that they can oscillate along the shaft as indicated by the arrows. This oscillation may be done by some automatic drive which is driven from the motor 9 or from some other power source. As can be seen from FIGURE 3 downward pressure on the rollers 14 cause local distortions of the felt cylinder 6. These distortions have been found to speed the felting process as there tends to be a field of pressure about the position of contact of each roller 14 which acts through a wide range of directions unlike the pressure which is applied by the idler rollers 12. When the rollers 14 are used it is desirable they be so oscillated as to provide an even consolidation over a period of time across the full length of the cylinder of felt so that the diminution in diameter of the cylinder is consistent throughout the length of the cylinder.

In an alternative form the felt cylinder 6 can be shaped by the use of rollers of this type which are moved only over a predetermined range thus providing the felt in this range in a harder condition than the remainder and also having a smaller diameter than the remainder.

Referring now to FIGURE 4 the apparatus illustrated therein is basically the same as the apparatus illustrated in FIGURE 1 except that the side plates 13 are replaced by shaft mounted rollers 16, the shafts 17 preferably being movable relative to the cylinder of felt 6. It can be seen that these rollers 16 are conical so as to compensate for the variations in peripheral speed of the felt cylinders as the speed of rotation of this cylinder is of course, greater near its periphery than near its centre.

The shafts 17 are preferably movable so as to be adapted to apply a pressure to the end of the felt cylinder 6 to ensure hardening of this end as well as being adjustable for different required widths of cylinder. This arrangement of rollers 16 is most suitable where relatively small articles are to be made so that there is provided, in fact, a double hardening action the first being that as described with relation to FIGURE 1 and the second being with relation to a pair of rollers 16, one on either side of the cylinder.

The use of rollers 16 can also, to a certain extent, permit the hardening of felt with a minimum decrease in diameter thereof. In this way the idler rollers although they have pressure thereon do not tend to move past a predetermined position at which time on shrinkage of the felt cylinder there can be a decrease in axial length because of the inward pressure of the rollers 16 which decrease in axial length is, to a certain extent, reflected by a tendency to prevent the lessening of the diameter of the felt. Also the use of rollers 16 can tend to give a hardening action which is very similar to the rollers 14 previously referred to in that the inward pressure is at any time concentrated and thus there is a distortion at the end of the cylinder 6 which is not the case when the plates 13 are used.

It is understood that the effectiveness of the rollers 16 depends on the axial length of the felt cylinder 6 the smaller the length the more effective the action of the rollers.

Figure 5:
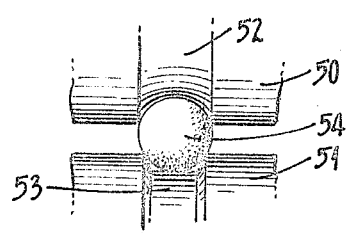
FIGURE 5 is a schematic illustration to illustrate how the invention can be used to hardened felt of a cylindrical form either as a solid cylinder or as covering on an article such as a tennis ball.

In FIGURE 5 there is illustrated schematically a pair of rollers which are adapted to apply pressure to felt of substantially spherical form. This figure is schematic and it is designed mainly to show that the present invention is not solely applicable to hardening cylindrical shapes but can also be used to harden other shapes provided the rollers are correctly formed. In this embodiment there are two rollers 50, 51 shown, each of which has a central shaped portion 52, 53. The felt body 54 illustrated is spherical in form and this may either be a solid sphere of felt, as could be used for a child's toy, or alternatively it could comprise an article such as a tennis ball having a loose felt layer applied thereabout which layer is to be hardened and shrunk onto the rubber core. Rotation of the rollers 50, 51 causes flexing of the felt, whether solid or as a layer about a core and the felt tends to lessen in size as the fibres intertwine and harden thus, if the felt is about a core causing the felt to be firmly held against the core.

Figure 7:
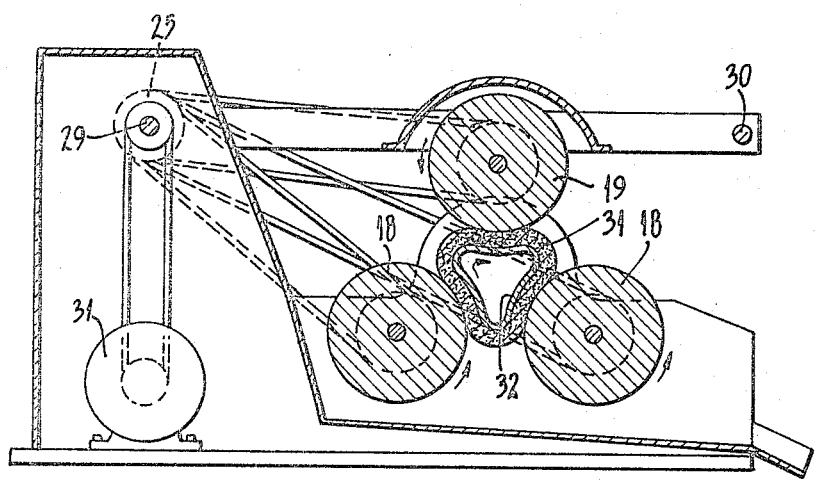
FIGURE 7 is a sectional view of the apparatus illustrated in FIGURE 6 but in which the felt is in the form of a tube.

The apparatus illustrated in FIGURES 6 and 7 is basically similar to that of FIGURE 1 but uses slightly different criteria to obtain its desired hardening. This apparatus has three rollers two lower rollers 18 and an upper roller 19 each of which is of the same diameter and each is mounted on a shaft, the lower roller 18 being on shaft 20 and the upper roller 19 on shaft 21 and each shaft carries on one end a sprocket 22, 23, 24. Each sprocket is connected by a chain to one of a trio of drive sprockets 25 which may be driven by an electric motor 31 or in any other way. Each of the rollers 18 and 19 is provided with a slightly roughened surface to ensure good frictional contact with a cylinder of felt 26 which is adapted to be poistioned therebetween.

The lower rollers 18 are each mounted in bearings which are connected to a frame 27 and the upper roller 18 is carried on a frame 28 which is pivotally connected to the frame 27 with the pivot being co-axial with the shaft 29 which carries the drive sprockets 25.

Thus the frame 28 can be rotated relative to the frame 27 at any time without disturbing the drive to the upper roller 19.

In operation this device is similar to that of FIGURE 1 except for one difference. The rollers 18 and 19 are by design larger in diameter than the cylinder of felt 26 which it is desired to harden. Thus when a cylinder of felt is placed on the two lower rollers 18, the upper roller 19 is brought into position and all the rollers are driven, it is possible to apply sufficient pressure to the upper roller 18 by means of handle 30 to compress the cylinder of felt 26 and cause a physical distortion of this cylinder 26 so it assumes the condition which is partly triangular.

During the rotation of the felt cylinder 26 there is a wave like motion on the surface of the cylinder which produces relative movement of adjacent fibres in the cylinder and this, together with the compression by the rollers, causes the hardening. During this operation the forces within the cylinder caused by the compression act in all directions because of the distortion throughout the felt cylinder.

It has been found that there is a maximum distortion which is satisfactory and beyond which layering or cavitation of the cylinder tends to occur. It is to minimize the likelihood of such malformation that the rollers are of a larger diameter, preferably twice the diameter of the felt cylinder to be hardened, as previously mentioned.

The hardening operation can be speeded causing at least one of the rollers, preferably the upper roller 19, to be vibrated either automaticaly or by providing a manual vibratory movement to the handle 30.

In practice this apparatus provides very much improved felting properties compared to the use of rollers which do not distort the felt cylinder.

This apparatus is also provided with some form of restraining means to limit axial expansion of the felt cylinder 26. As illustrated the retaining means comprise the side wall of the frame 27 but if required restraining plates could be connected to either lower roller or subsidiary rollers similar to those illustrated in FIGURE 4 could be used if desired.

The arrangement shown in FIGURE 7 shows the use of the apparatus with felt which is not a solid cylinder but is a cylindrical tube 31 which has therein a central core 32. This core is made of flexible material and may be filled with any fluid. In some applications where high pressures are not necessary the central core may well be filled with air but where greater pressures are being applied to the tube 31 a liquid may preferably be used.

This form of apparatus is highly effective if very hard felt is required because the tube tends to felt both from the outside in and from the inside out, thus there is not only a hardening action caused by close entwining of the fibres in the outer layer but also from the interconnection of the fibres on the inside adjacent to the core.

The apparatus illustrated in FIGS. 8 and 9 shows one way of hardening an endless belt of felt 33. In this embodiment the belt of felt 33 is passed over the pulleys 34 and 35 one or both of which may be driven. A pressure pulley 36 is mounted on a shaft 38 and is of such a width that it is adapted to pass between flanges 37 on the pulley 34. In use the pulleys are driven and the belt 33 starts to pass over the pulleys 34 and 35 and pulley 36 is forced into physical contact with the belt 33 as it passes over the pulley 34. This pressure starts the felting action which is aided by the flexing of the belt 33 as it passes over the pulley. This flexure causes the fibres to tend to interact achieving the desired effect in association with the pressure applied by pulley 36 and the flanges 37 prevent an expansion of width of the belt 33 which is normally undesirable.

In this way there can be provided a belt which is accurately sized with regard to width which is usually the important dimension, as variations in length, within a certain range, can be compensated by use of idler pulleys or the like in any apparatus in which the belt is to be used.

Alternatively the belt when hardened may be removed from the apparatus and cut into lengths and used in place of felt made on normal flat felting machines.

The embodiment illustrated in FIG. 10 is to a certain extent similar to that of FIGS. 8 and 9. In this case there is provided one pulley 39 which is driven and two pressure pulleys 40 and 41 which are adapted to apply pressure to a felt band 42 which passes about the pulley 39. The pulley 39 is provided with flanges 43 which once again limit the expansion of the width of the belt during the felting operation. In this case the action of the belt passing over the pulley 39 causes part of the felting whilst the pressure caused by pressure pulleys 40 and 41 and their associated distortion causes the remainder of the felting.

This form of apparatus can be used either for providing endless felt belts or for hardening a felt belt before this is cut into lengths for use as flat felt.

The embodiment of the invention illustrated in FIG. 11 is similar to that of FIG. 1 but provides a method of applying pressure to both the inside and the outside of a felt annulus. In some applications it is desired to form relatively heavy tubes which are later cut to lengths to provide annular buffs and the like which need to be exceedingly hard. These annular buffs can be provided by forming cylinders as illustrated with relation to FIG. 1 or with FIG. 6.

In the modified form of the apparatus there is provided a roller 44 which is adapted to pass through the centre of a felt tube 45 whilst this is being hardened. This roller 44 is provided with a shaft 46 which is movably journalled in a frame 47 which is pivotally connected to the base 2 or which is connected to the frame members 10. Connected to the frame 47 is a pressure handle 48 which is pivotally mounted to the apparatus so that on upward movement the roller is forced down onto the inner surface of the tube 45 and pressure is thus applied between the roller 44 and each of the rollers 5. Thus under the circumstances there is obtained what is effectively a second hardening action causing the inner surface of the annulus to be hardened at the same time as the outer surface thus both speeding the hardening process and also forming a harder end product. Although this lever system has been shown in one manner it will be understood by persons having any mechanical skill that this could be provided in several other alternative ways. It is of course essential that the roller 44 be removable so that the felt annulus can be readily fitted and removed.

In the use of the apparatus of this embodiment the relation between the inside and outside pressures can be used to control one of the dimensions of the hardened tube 45.

The greater the applied outside pressure the smaller the external diameter and the greater the applied inside pressure the larger the internal diameter. By controlling these two pressures the form of the tube made can be controlled to a large degree.

Another way of achieving the same inner hardness is to form the felt about a central core which may be of wood or any other relatively cheap hard material. When the hardening action is commenced and the felt cylinder starts to contract and pulls down onto the core and hardening commences from the inside as well as the outside. In many applications it is possible to provide a core with a central aperture and after the hardening operation the core does not have to be removed. This can be particularly satisfactory in the case of the felt buffs which after only a small amount of wear are discarded as being unsatisfactory. Thus a buff which has an original diameter of, say, four or six inches may be discarded when its external diameter reaches three or five inches and thus a great deal of felt is wasted. If initially these buffs were provided with, say, a two or three inch central core of wood or the like this could be discarded at little expense when the buff has reached the end of its economic life.

We claim:

1. A method of hardening a tube of felt comprising confining a felt tube between a plurality of rollers, rotating said felt tube by driving at least one of the rollers, applying pressure to the external surface of the felt tube on rotation, and applying pressure to the internal surface of the felt tube.

2. An apparatus for hardening a cylinder of felt including a plurality of spaced rollers, one of said rollers being moveable to permit the insertion of the cylinder, means for driving one of the rollers to cause rotation of the cylinder, and means for restraining lateral expansion of the felt cylinder during its rotation.

3. An apparatus according to claim 2 including rollers which act on each end of the cylinder during its rotation to restrain the felt cylinder against lateral expansion.

4. An apparatus for hardening a cylinder of felt which includes a plurality of spaced rollers, means for driving at least one of the rollers to cause rotation of the cylinder of felt maintained between the spaced rollers, one of the said rollers being moveable to permit insertion of the cylinder of felt and to apply pressure thereto during rotation, and at least one of the rollers being short relative to the width of the other of the rollers and means for moving said short roller along the length of the other rollers.

5. An apparatus according to claim 4 including a plurality of such short rollers.

6. An apparatus for hardening felt comprising a plurality of rollers one at least of which is driven and one at least of which is moveable, the rollers being so spaced as to receive a cylinder of felt therebetween and the moveable roller being able to apply a pressure to such a cylinder and at least one pair of conical rollers, means moveably mounting said conical rollers with their axes perpendicular to the axes of the other rollers.

7. An apparatus for hardening felt tubes comprising a plurality of rollers one at least of which is driven and one at least which as moveable, the rollers being so spaced as to receive a tube of felt therebetween and the moveable roller being able to apply a pressure to such tube and a further roller positioned between the other roller which is removeable and which has means whereby pressure can be applied to the inner surface of the tube.

8. An apparatus according to claim 7 wherein one of the rollers is provided with peripheral flanges to restrain a felt tube from expanding laterally.

9. A method of hardening a felt tube comprising the steps providing an elongatable flexible core for a felt tube; positioning the felt tube and core in a confined zone formed by plurality of rollers; causing said felt tube and core to rotate in said confined zone while applying pressure to the outer surface thereof through the rollers; to thereby compact and harden the felt and decrease the diameter of the core.

10. A method as claimed in claim 9 wherein the flexible core is fluid filled and the fluid is released when its internal pressure reaches a predetermined value.

References Cited

UNITED STATES PATENTS

| | | | |
|---|---|---|---|
| 763,273 | 6/1904 | Flavell et al. | 28—5 X |
| 1,721,470 | 7/1929 | Ricalens | 28—72.3 |
| 2,604,503 | 7/1952 | Smith | 28—5 X |

FOREIGN PATENTS 5,934  4/1891  Great Britain.

MERVIN STEIN, *Primary Examiner.*

L. K. RIMRODT, *Assistant Examiner.*